UNITED STATES PATENT OFFICE.

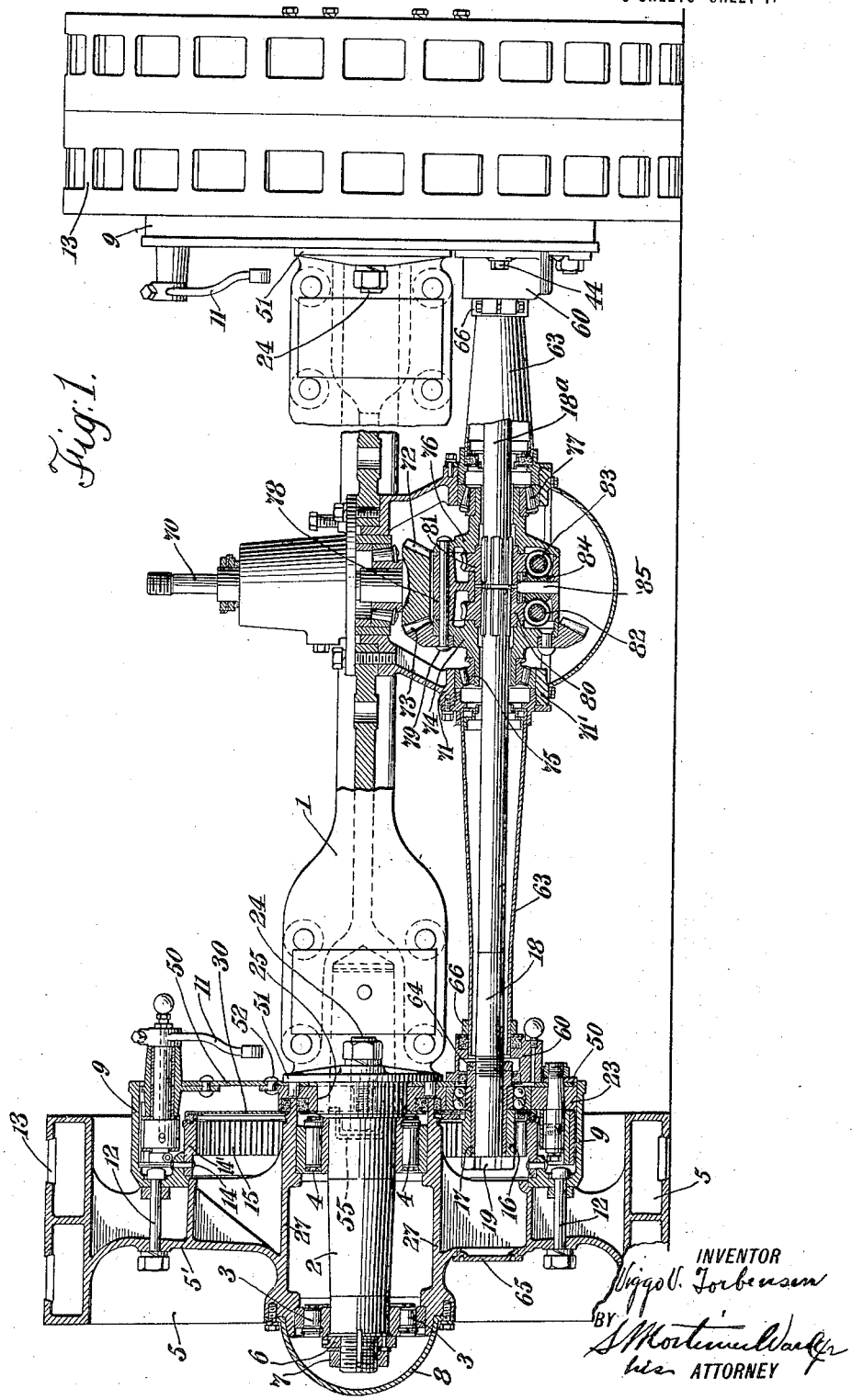

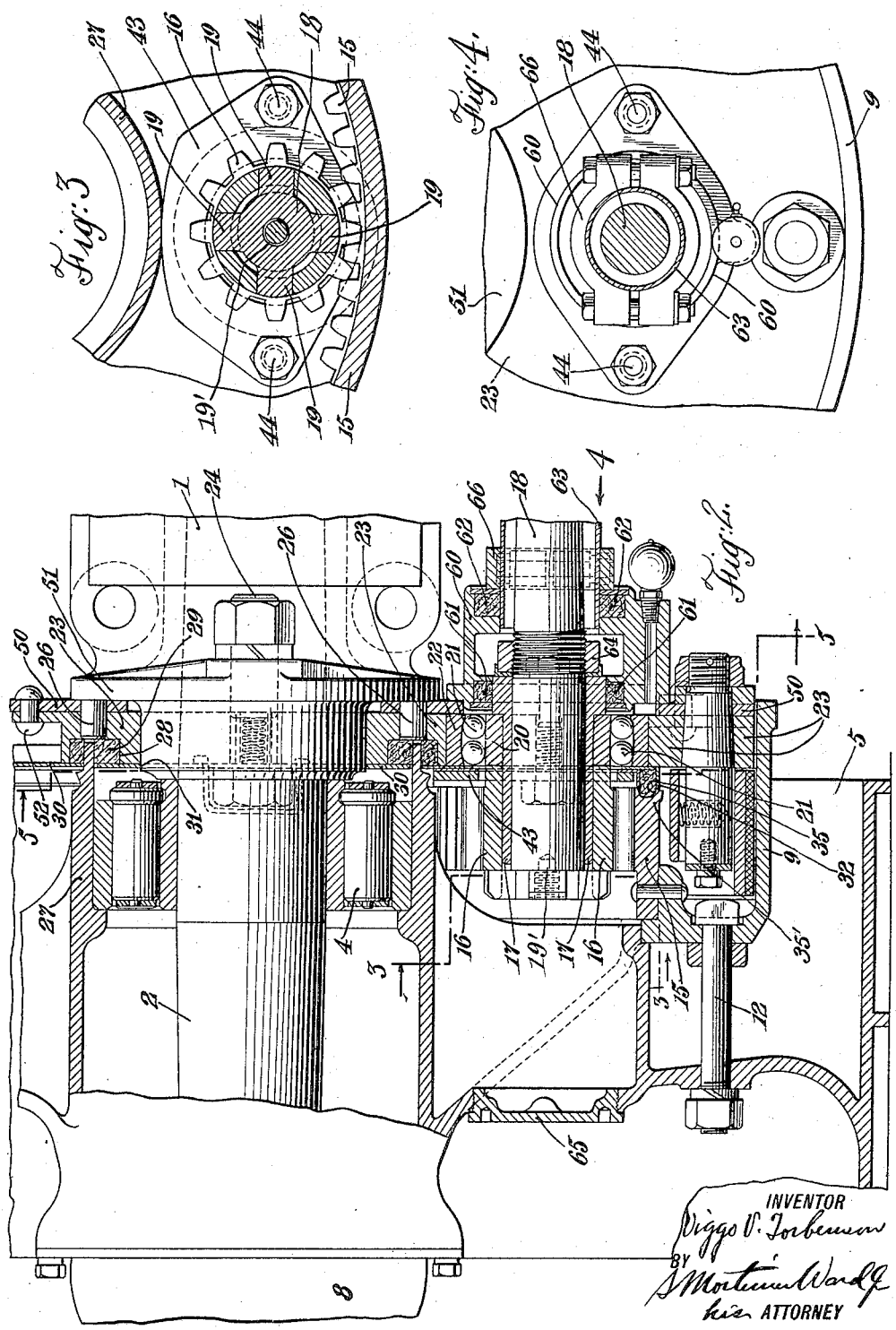

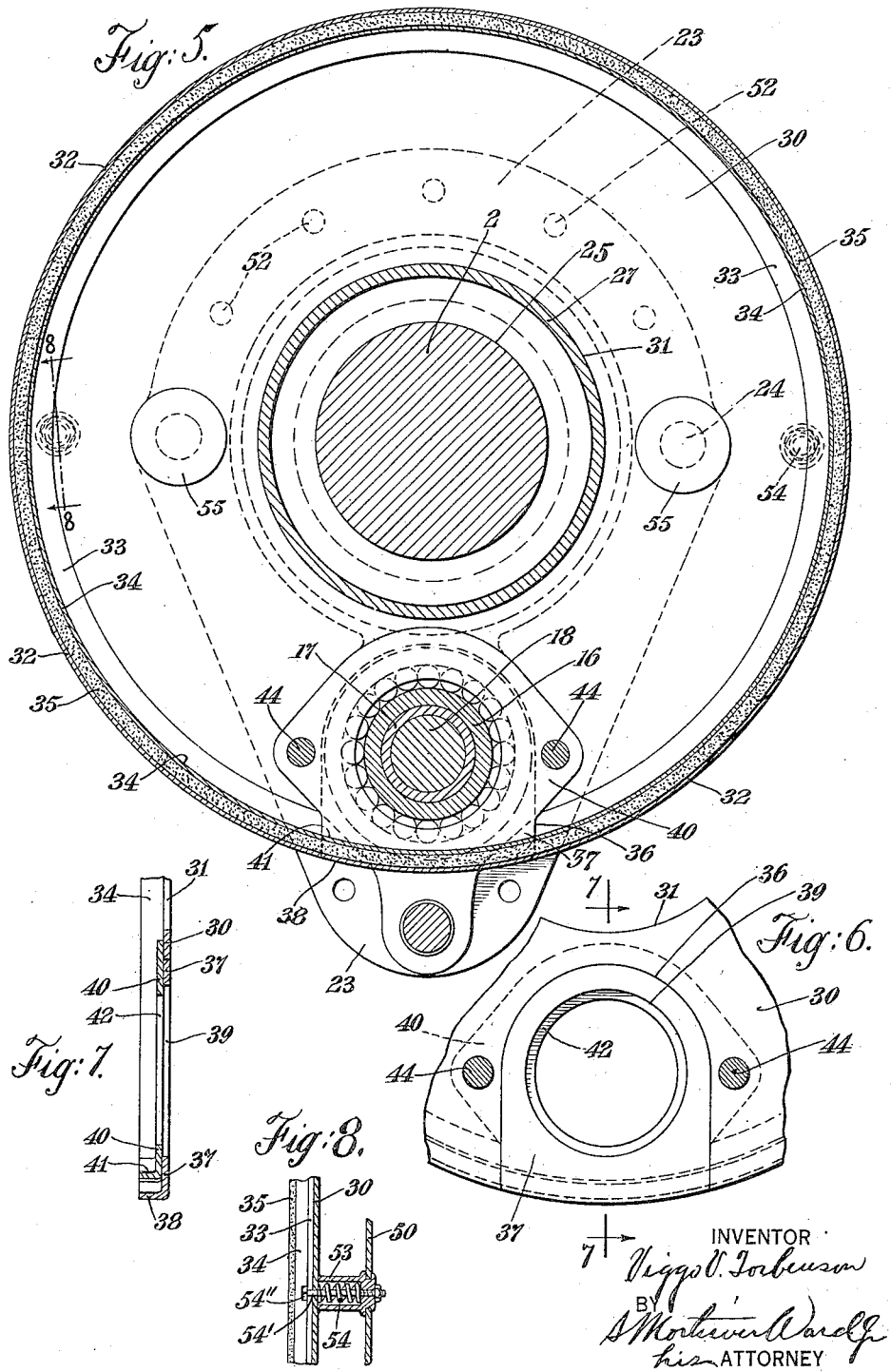

VIGGO V. TORBENSEN, OF CLEVELAND, OHIO, ASSIGNOR TO THE TORBENSEN AXLE COMPANY, OF CLEVELAND, OHIO, A CORPORATION OF OHIO.

DRIVING MECHANISM FOR MOTOR-VEHICLES.

1,397,491.      Specification of Letters Patent.      Patented Nov. 15, 1921.

Application filed May 28, 1918. Serial No. 237,040.

*To all whom it may concern:*

Be it known that I, VIGGO V. TORBENSEN, a citizen of the United States, and a resident of Cleveland, in the county of Cuyahoga and State of Ohio, have invented certain new and useful Improvements in Driving Mechanism for Motor-Vehicles, of which the following is a specification.

This invention relates to driving mechanism for motor vehicles, and it is especially useful in heavier types of motor vehicles, such as trucks, utilizing internal gear drive.

Internal gear drive trucks, as is well known have the ring gear and one or more pinions at the wheel inclosed in a casing or housing to retain the grease and protect the bearing from dirt. Heretofore, in machines having this construction, if anything should go wrong with the differential gearing or the jack shafts, neither could be taken down for repairs or replacement without removing the tread wheels; and in heavy trucks, particularly those using steel wheels, the wheels are so heavy that they cannot be handled on the road or without special apparatus. It is, therefore, important to provide for the removal or displacement of the driving shafts and for the removal of the differential gearing without having to remove the tread wheels; and this is one of the objects of my invention.

Another object of the invention is to provide simple and efficient means for this purpose, permitting the jack shafts to be displaced endwise, after which the differential gearing may be removed.

Another object of the invention is the maintenance of the mesh of the driving pinion at the wheel with its adjacent gear when the driving shaft is displaced or removed.

My invention consists in the novel features and combinations of parts hereinafter described in their preferred form, and the invention is more particularly pointed out in the appended claims.

Further objects and advantages of the invention and features of improvement will more fully appear from the following description taken in connection with the accompanying drawings, in which Figure 1 is a plan view largely in horizontal section of a driving apparatus embodying my invention in a preferred form, Fig. 2 is a similar but enlarged view of a portion of the apparatus shown in Fig. 1; Fig. 3 is a section taken on the line 3—3 of Fig. 2; Fig. 4 is an end view of parts shown in Fig. 2 and looking in the direction of the arrow 4 in Fig. 2; Fig. 5 is a section taken on the line 5—5 of Fig. 2, looking in the direction of the arrow; Fig. 6 is a detail of parts shown in Fig. 5 but looking in the opposite direction; Fig. 7 is a section taken on the line 7—7 of Fig. 6; and Fig. 8 is a section taken on the line 8—8 of Fig. 5.

In the drawings, 1 represents a non-rotating supporting axle structure known as a dead-axle or load-carrying axle having at its outer ends stub spindles 2 provided with roller bearings 3 and 4 on which the wheel structure 5 rotates, the wheel structure being retained on the axle by nuts 6 and 7 and a cap 8 covering the nuts and bearings 3. Secured to and practically forming part of the wheel structure is a brake drum 9 within which is located any well-known or suitable brake apparatus coöperating with the drum 9 and operated by crank lever 11. The brake drum member is rigidly secured to the web 5 of the wheel structure by bolts 12, and the wheel structure is provided with a peripheral tread rim 13 which in this instance is of steel and formed integrally with the web.

Rigidly secured to the brake drum member 9 (Fig. 1) by rivets 14 and forming a part of the wheel structure, is a ring 14' having gear teeth 15 for driving the traction wheel structure. Meshing with this gear there is a driving pinion 16 (Figs. 1 and 2) having a tight fit on a sleeve 17 surrounding a driving shaft 18. This sleeve constitutes an extended hub for the pinion for journaling the pinion in the annular bearing. The jack shaft 18 has integral with it at its end, four radial projections 19 (Fig. 3) which fit into cut-out parts in the end of the pinion 16 so that shaft 18 is locked with the pinion 16 and will drive the same. The sleeve 17 carries an inner bearing ring 20 (Fig. 2) around which are located ball bearings 21 and an outer bearing ring 22 fitting snugly within a circular opening in a spider or plate 23 rigidly secured to the axle structure by bolts 24. The bearing thus serves both as a bearing for the outer end of the drive shaft and as a means for supporting the pinion in operative position when the driving shaft is displaced axially. The plate 23 also has a central opening at 25 through which the main axle member extends. To more rigidly secure the member 23 with respect to the axle structure, dowel pins 26 extend from the latter into the member 23.

The wheel structure 5 is provided with a hub portion 27 extending over the bearings 4 and into a circular recess 28 in the member 23 to form a running joint therewith, the recess being filled with an oily felt packing 29 on both sides of the hub portion 27 to effectively exclude dust and dirt from the bearings 3 and 4 and to prevent oil from running out of the hub portion.

The internal gear 15 is closed to dust and dirt on one side by the wheel structure, and on the other side by a plate 30 having a central opening at 31 (Figs. 2 and 5) through which the hub portion 27 passes and provided with an upturned flange 32 at the periphery. Secured to the plate 30 is a flat ring 33 provided with a concentric upturned flange 34 so as to form a groove with flange 32, which is filled with an oily felt packing 35 which extends into an opposing groove 35' in the wheel structure (in this instance formed in the end of the internal gear ring) and forms a running lubricated joint therewith so that dust and dirt are effectively excluded from the chamber containing the internal gear 15 at this point, as well as from the hub chamber containing the bearings 3 and 4. The two chambers are made independent by reason of the hub portion 27 extending into the member 23, and the plate 30 bears against and aids in retaining the packing 28 in the circular groove in the member 23 so that dust and dirt are excluded from the internal gear chamber at this point.

In order to accommodate the drive shaft 18 and the bearings therefor, the plate 30 and member 33 are cut away from their periphery as shown at 36 in Figs. 6 and 7, and in the plane of the plate 30 is inserted a plate 37 having an upturned flange 38 forming a continuation of flange 32, and having a circular opening 39 through which the sleeve 16 passes. Adjacent the plate 37 is placed another plate 40 having an upturned flange 41 corresponding to the flange 34 on ring 33 so that a groove is formed between the flanges 38 and 41 which is filled with similar packing forming a lubricating running joint with the opposing groove in the internal gear member 15. The plate 40 also has an opening 42 through which the sleeve 16 passes. A third plate 43 is bolted to the member 23 by bolts 44 with the plates 37 and 40 between the plates 43 and member 23, so that the plates 37 and 40 are securely held in position on the member 23, the plate 40 overlapping the cutaway edge of the plate 30 so as to hold the latter in place against the member 23.

A plate 50 (Figs. 1 and 2) is rigidly secured between the member 23 and shoulder 51 on the axle, the plate 50 being riveted to member 23 by rivets 52, and being cut out to permit of insertion of the axle portion 2 and drive shaft 18 therethrough. This plate 50 substantially closes the third chamber occupied by the emergency brake apparatus, to dust and dirt.

Secured to the plate 50 are two thimbles 53 containing springs 54 (see Fig. 8 also) which bear against the plate 30 tending to force the periphery of the latter toward the internal gear member, so that packing carried by the plate 30 will bear against the internal gear member with a spring pressure and thus continue to maintain a good joint as the packing wears, and more positively exclude dust and dirt and prevent oil from getting into the emergency brake chamber. In order to limit the outward movement of the spring-pressed plate 30 when the wheel is removed, I provide bolts 54' threaded into the bottoms of the thimbles 53 and having heads 54" adapted to be engaged by the plate 50 after it has been moved out a certain distance.

Felt packing cups 55 are secured over the heads of bolts 24 to prevent oil leaking out of the internal gear chamber through the bolt holes.

A drive shaft sleeve securing member 60 (Figs. 2 and 4) is held firmly up to plate 50 and member 23 by means of the bolts 44 and is provided with packings at 61 and 62 to prevent oil running out from the bearings 21. A sleeve 63 covers the greater portion of the drive shaft 18 and a spring clamping nut 66 clamped onto the sleeve 63 holds the packing 62 in place. A nut 64 screw-threaded on the jack shaft 18 maintains the sleeve 17, bearing member 20, pinion 16 and drive shaft 18, pressed together from longitudinal displacement. A screw cap 65 closes an opening in the web of the wheel structure opposite the driving shaft 18, and on removing this cover the end of the driving shaft may be easily reached therethrough.

In assembling, the bearing 20 with the balls 21 and ball raceway 22 is pressed onto the sleeve 17, and the parts so far assembled are then slipped in place in the member 23; then the plates 37, 40 and 43 are slipped loosely over the sleeve 17 and screw bolts 44 are tightened up to force and secure in place the whole bearing by means of plate 43. The pinion 16 is then fitted tightly on the sleeve 17, and thereafter the pinion, sleeve and bearing ring 20 remain relatively fixed as a unit, functioning as if one piece. All this is done before the tread wheel is slipped onto the axle spindle 2.

The tread wheel may then be put onto the axle spindle 2 and secured in place by nuts 6 and 7, after which the driving shaft or jack shaft 18 is slipped through the opening normally closed by the screw cap plate 65, and through the sleeve 17 and so that the teeth 19 thereon fit in the cutaway portions in the end of the pinion 16 so as to drive the latter. The nut 64 is then tightened up to secure the driving shaft 18 in place in the sleeve 17 and bearing. The driving shaft sleeve, securing member 60 is then moved along the sleeve 63 and up to the member 23 and bolted thereto by means of nuts cooperating with the ends of the screw bolts 44 which pass through lateral openings in the member 60. Then the spring clamping nut 66 may be secured in place to hold the packing 62 in place.

70 (Fig. 1) represents the main driving shaft extending through the supporting axle structure into the differential gearing casing 71, which is split longitudinally. The differential gearing comprises bevel gear 72 secured to the end of the shaft 70 and meshing with a bevel gear 73 secured to one end 74 of a housing journaled on roller bearings 75. The other end 76 of the housing is journaled on roller bearings 77, and an intermediate portion 78 of the housing is rigidly secured to the end portions 74 and 76 by means of bolts 79. Journaled in the middle portion 78 of the housing are two worm wheels 80 and 81 having worms 82 and 83 respectively meshing therewith and journaled in the central portion 78 of the rotatable housing. A small worm wheel 84 is also journaled in the central portion 78 of the housing on a spindle 85 and meshes with both of the worms 82 and 83. The driving shaft 18 passes freely through a central opening in the end portion 74 of the housing and is keyed to the worm wheel 80 of the differential gearing. Another driving shaft 18ᵃ passes freely through a central opening in the end portion 76 of the housing and is keyed to the worm wheel 81 of the differential gearing. The shaft 18ᵃ drives the traction wheel on the opposite side of the vehicle which in all substantial respects is the same as that on the left hand side of Fig. 1 as is previously described.

Upon driving the shaft 70 the pinion 72 drives the bevel pinion 73 which, being secured to the housing, rotates the differential housing on the bearings 75 and 77. This gives the worm wheel 84 a planetary movement which through the worms 82 and 83 and the worm wheels 80 and 81 propels the driving shafts. The connection between the worm 82 and 83 through the worm wheel 84 permits of the required differential movement. This differential movement is well known as an "M and S" locking differential, and it is shown and described in United States Letters Patent No. 1,090,082, granted to Wm. F. Muehl, March 10, 1914. However, any other suitable or well-known form of differential movement may be used.

If at any time it becomes necessary to remove the differential gearing, the clamp 66 and member 60 (Fig. 2) are loosened so as to permit of access to the nut 64, which is then screwed off of the threads on the shaft 18. The cap 65 is then removed and a tool screwed into the end of the shaft 18 at 19', and the latter pulled thereby toward the opening covered by cap 65. In this manner the shaft 18 may be readily and quickly removed endwise sufficiently to unkey and free it from the differential gearing without removing the tread wheel, and leaving the relatively fixed parts—i. e, pinion 16, sleeve 17 and bearing ring 20 supported in place within the wheel gear chamber without getting the pinion 16 out of mesh with the gear 15. With the jack shafts thus displaced, the differential gearing may be taken out by removing the rear half 71' of the casing, the casing being split or divided along its longitudinal axis and suitably bolted together, as is well understood and therefore not shown.

Since the differential gearing is supported in the casing assembled entirely independent of the jack shafts 18 and 18ᵃ, it will remain in place after the jack shafts have been removed, and likewise it can be assembled in place, after repairs, before the jack shafts are reinserted. Also, since sleeve 17 and pinion 16 at the end of the jack shafts are held supported in place in mesh with the ring gear, the pinion will remain in position in mesh with the ring gear after the jack shaft is withdrawn, partly or wholly, so there is no danger of displacing or disaranging any of the gearing by the removal of the jack shafts; and when the repairs have been made, either or both jack shafts for this reason can be very quickly slipped back in place and the keys in the end of the shaft made to register with the keyways in the differential gears by turning the shaft to bring any suitable markings into register, such for example as registering lines on the outer ends of the shafts and on the outer ends of the pinions 16, as will be well understood. By providing the above arrangement permitting easy removal of the driving shafts 18 and 18ᵃ without the necessity of removing the traction wheels, the differential gearing is easily removed without requiring any special apparatus especially for jacking up the vehicle and removing the traction wheels.

Various features herein shown and described pertainig especially to the ararngement for inclosing the internal gear 15 and pinion 16 and inclosing the brake apparatus are not herein claimed but they form the subject matter of a co-pending application Serial Number 235,085, filed by me on May 17, 1918, entitled Motor vehicle driving mechanism.

While I have described my invention in great detail with respect to the present embodiment thereof, it will be obvious to those skilled in the art, after understanding my invention, that various changes and modifications may be made therein without departing from the spirit or scope thereof, and I aim in the appended claims to cover all such changes and modifications.

Having thus described my invention, what I claim as new and desire to secure by Letters Patent, is:

1. In driving mechanism for motor driven vehicles, the combination of a dead-axle, a traction wheel at each end thereof, a differential gear casing intermediate the ends of said axle and differential gearing therein, driving shafts extending along said dead-axle from said gearing and having their inner ends detachably secured to the differential gearing so that said axles may be moved endwise therefrom, means gearing said driving shafts to the traction wheels, said means comprising internal gears carried by the wheels, and pinions meshing therewith and slidably interlocked with the driving shafts so that the shaft may be moved outwardly through the pinion from engagement with the differential gearing, and means for supoprting said pinions in place in mesh with the internal gears when said driving shafts are moved.

2. In driving mechanism for motor driven vehicles, the combination of a dead-axle, a traction wheel at each end thereof, a differential gear casing intermediate the ends of said axle and differential gearing therein, drive shafts extending along said dead-axle from said gearing and having their inner ends detachably secured to the differential gearing so that said shafts may be moved endwise therefrom, means gearing said drive shafts to the traction wheels, said means comprising internal gears carried by the wheels, and pinions meshing therewith and detachably interlocked with the drive shafts so as to be disengaged therefrom by the endwise movement thereof, and protective casings for said last gearing formed in part by the wheel structures and having provision on their outer sides permitting access to the ends of said drive shafts and the shifting of the same outwardy to disengage the drive shafts from their differential gears.

3. In driving mechanism for motor driven vehicles, the combination of a dead-axle, a traction wheel at one end thereof, a drive shaft extending along said dead-axle, means including a gear detachably secured to said drive shaft for transmitting power to the same, gearing at the end of said drive shaft for driving the wheel, said last gearing comprising a pinion detachably secured to the said drive shaft so as to permit relative outward movement of the shaft with respect to the pinion and first gearing, and means for supoprting said pinion in place and in mesh with its gear when the drive shaft is moved endwise.

4. In driving mechanism for vehicles, the combination of a supporting axle, a traction wheel thereon, a driving shaft for said wheel, gearing at the outer end of said driving shaft by means of which the driving shaft drives said wheel, said shaft and gearing being constructed to permit of the driving shaft being moved outwardly longitudinally of the driving shaft without disengaging said gearing with respect to the traction wheel.

5. In driving mechanism for motor vehicles, the combination of a dead-axle, a traction wheel at one end thereof, a drive shaft extending along said dead-axle, means including a gear detachably secured to said drive shaft for transmitting power to the same, a pinion detachably secured to the end of said drive shaft so as to permit relative endwise movement of the shaft with respect to the pinion, an internal gear secured to the wheel and meshing with said pinion, a protective casing for said pinion and internal gear formed in part by the wheel structure which is provided with an opening permitting access to the end of said drive shaft and the shifting of the drive shaft to disengage it from its driving gear, a closure cap for said opening, and means in the end of said drive shaft for receiving a tool for the shifting of said shaft.

6. In driving mechanism for vehicles, the combination of a supporting axle, a traction wheel thereon, a driving shaft extending along said axle and eccentric to said traction wheel, gearing at the outer end of said shaft whereby the shaft drives the wheel, a gear on the inner end of said driving shaft for driving the shaft, said gearing and shaft being constructed to permit of the shaft being moved outwardly independently of said last-mentioned gear and without disengaging said first-mentioned gearing with respect to the traction wheel.

7. In driving mechanism for vehicles, the combination of a traction wheel, an axle therefor, an internal gear rigid with the wheel, a driving shaft, differential gearing with which the inner end of said shaft has a slidable driving connection, a pinion geared to said internal gear for driving the latter, and a sleeve supporting said pinion independently of the driving shaft, said pinion being detachably interlocked with said shaft whereby the shaft drives the pinion but the shaft may be shifted axially of the pinion to remove it from interlocking engagement with the differential gearing without disturbing the position of the pinion.

8. In driving mechanism for vehicles, the combination of a traction wheel, an axle therefor, a gear rigid with the wheel for driving the same, a drive shaft, a pinion geared to said gear for driving the latter, a bearing carried by the axle, and a supporting member for said pinion journaled in said bearing and from which the pinion is supported independently of said drive shaft, said pinion being detachably interlocked with said shaft whereby the shaft drives the pinion, but the shaft may be shifted axially of the pinion to remove it from interlocking engagement therewith without disturbing the position of the pinion.

9. In driving mechanism for vehicles, the combination of a traction wheel, an axle therefor, a gear rigid with the wheel for driving the same, a drive shaft, a pinion geared to said gear for driving the latter, a bearing carried by said axle, a sleeve journaled in said bearing and supporting said pinion independently of the driving shaft, said pinion being detachably interlocked with said shaft whereby the shaft drives the pinion but the shaft may be shifted axially of the pinion to remove it from interlocking engagement therewith without disturbing the position of the pinion, threads on said shaft at the rear of said sleeve, and a nut on said threads adapted to engage a part with respect to which the shaft is longitudinally movable, whereby screwing up on the nut will force the shaft inwardly.

10. In driving mechanism for vehicles, the combination of a traction wheel, an axle therefor, an internal gear rigid with the wheel, a driving shaft eccentric to the traction wheel, a pinion for driving said internal gear, a sleeve supporting said pinion independently of the driving shaft, said pinion being detachably interlocked with said shaft whereby the shaft drives the pinion but the shaft may be shifted axially of the pinion to remove it from interlocking engagement therewith without disturbing the position of the pinion, inclosing means for said pinion and gear substantially inclosing same against dust and dirt, and a removable cap on the front of said inclosing means covering an opening opposite the end of the driving shaft.

11. In driving mechanism for motor driven vehicles, the combination of a deadaxle, traction wheels at the outer ends thereof, differential gearing intermediate said wheels, drive shafts for the wheels, the inner ends of said shafts having a detachable driving connection with the differential gearing so that the shafts may be pulled outwardly therefrom, and gearing at the outer ends of the drive shafts for driving the wheels, including a driving pinion on each shaft having a detachable driving connection therewith, the shafts being such as to permit their being pulled outwardly through their respective pinions to disengage their inner ends from the differential gearing, to permit removal of the latter without removing the wheels.

12. In driving mechanism for motor driven vehicles, the combination of a deadaxle, traction wheels at the ends thereof, differential gearing intermediate said wheels, drive shafts extending between the differential gearing and the wheels, the inner ends of said shafts having slidably disengageable connections with the differential gearing, gearing at the outer ends of the drive shafts for driving the wheels, including a driving pinion on each shaft having a detachable driving engagement therewith, the shafts and connections to their pinions being such as to permit the respective drive shafts to be pulled outwardly through their pinions to disengage their inner ends from the differential gearing, to permit removal of the latter, and means for retaining the pinions in place when the drive shafts are moved outwardly.

13. In driving mechanism for motor driven vehicles, the combination of a deadaxle having a differential gear chamber, differential gearing in said chamber, a traction wheel on said axle, a driving shaft for said wheel the inner end of which is slidably interlocked with the differential gearing, gearing at the outer end of said drive shaft by means of which said shaft drives the wheel, said shaft and the gearing at the wheel being arranged and constructed to permit of the shaft being slid outwardly to displace its inner end from the differential gearing to permit removal of the latter without disengaging said wheel gearing with respect to the traction wheel, said wheel gearing being inclosed on the outer side thereof by a part of the wheel structure, the wheel structure having an opening through which the shaft may be pulled, and a detachable closure for said opening.

14. In driving mechanism for motor driven vehicles, the combination of a deadaxle, a traction wheel at each end thereof, differential gearing intermediate said wheels, drive shafts extending from said gearing to the wheels and having their inner ends slidably interlocked with the differential gearing so that said shafts may be moved outwardly with respect to said gearing, a driven gear at each wheel for driving same, a pinion on each drive shaft geared to the the gear wheel, each pinion being slidably interlocked with its driving shaft and the shaft being such that it may be pulled outwardly through the pinion from engagement with the differential gearing, and an annular bearing member for each pinion adapted to support the same in operative position when the shaft is moved outwardly.

15. In driving mechanism for motor driven vehicles, the combination of a dead-axle, a traction wheel at each end thereof, differential gearing intermediate said wheels, drive shafts extending from said gearing to the wheels and having their inner ends slidably interlocked with the differential gearing so that said shafts may be moved endwise with respect to said gearing, means gearing each drive shaft to its wheel, said means comprising an internal gear for each wheel and a pinion geared thereto and slidably interlocked with the corresponding driving shaft, the shaft and interlocking being such that the shaft may be pulled outwardly through the pinion from engagement with the differential gearing, said pinion having a tubular hub extending laterally beyond the teeth of the pinion, and annular anti friction bearing members carried by the dead-axle and in which said hub is journaled.

16. In driving mechanism for motor driven vehicles, the combination of a dead-axle, a traction wheel at each end thereof, differential gearing intermediate said wheels, drive shafts extending from said gearing to the wheels and having their inner ends slidably interlocked with the differential gearing so that said shafts may be slid endwise with respect to said gearing, means gearing each drive shaft to its wheel, said means including an internal gear for each wheel and a pinion geared thereto and slidably interlocked with the corresponding driving shaft, the shaft and interlocking being such that the shaft may be pulled outwardly through the pinion from engagement with the differential gearing, an anti friction bearing having an outer bearing ring carried by the dead-axle, the pinion having a tubular hub extending laterally beyond the teeth of the pinion and journaled in said bearing, said bearing acting to hold the pinion from relative lateral movement with respect to the outer bearing ring and also serving as a bearing for the shaft, and detachable means for holding said outer bearing ring in place on the dead-axle from outward movement thereon.

17. In driving mechanism for motor driven vehicles, the combination of a dead-axle having a differential gear chamber with a detachable portion permitting the removal of the differential gearing from said chamber, differential gearing in said chamber, drive shafts extending from said differential gearing to the wheels and having their inner ends slidably secured to the differential gearing so that said shafts may be slid endwise with respect to said gearing, means gearing each drive shaft to its wheel, said means including an internal gear for each wheel and a pinion geared thereto and slidably interlocked with the corresponding driving shaft, the shaft and the interlocking being such that the shaft may be pulled outwardly through the pinion from engagement with the differential gearing, an annular bearing member for each pinion adapted to support the same in operative position when the shaft is moved outwardly, a chamber within the wheel structure for the gearing at the wheel, said chamber having an opening in its outer side through which the shaft may be pulled, and a detachable closure for said opening.

In testimony whereof, I have signed my name to this specification.

VIGGO V. TORBENSEN.

Certificate of Correction.

It is hereby certified that in Letters Patent No. 1,397,491, granted November 15, 1921, upon the application of Viggo V. Torbensen, of Cleveland, Ohio, for an improvement in "Driving Mechanism for Motor-Vehicles," errors appear in the printed specification requiring correction as follows: Page 3, line 61, for the word "worm" read *worms*, and lines 127 and 128, for "pertainig" and "ararngement" read *pertaining* and *arrangement;* page 4, line 34, claim 1, for "supoprting" read *supporting*, and line 36, after the word "moved" and before the period insert the word *endwise;* same page, line 71, claim 3, for "supoprting" read *supporting;* and that the said Letters Patent should be read with these corrections therein that the same may conform to the record of the case in the Patent Office.

Signed and sealed this 14th day of February, A. D., 1922.

[SEAL.]                          KARL FENNING,
*Acting Commissioner of Patents.*